US010402671B2

United States Patent
Abousleman et al.

(10) Patent No.: US 10,402,671 B2
(45) Date of Patent: Sep. 3, 2019

(54) SYSTEM AND METHODS FOR AUTOMATIC SOLAR PANEL RECOGNITION AND DEFECT DETECTION USING INFRARED IMAGING

(71) Applicant: General Dynamics Mission Systems, Inc., Fairfax, VA (US)

(72) Inventors: Glen P. Abousleman, Scottsdale, AZ (US); Xiang Gao, Tempe, AZ (US); Eric Munson, Phoenix, AZ (US); Jennie Si, Phoenix, AZ (US)

(73) Assignee: General Dynamics Mission Systems, Inc., Fairfax, VA (US)

( * ) Notice: Subject to any disclaimer, the term of this patent is extended or adjusted under 35 U.S.C. 154(b) by 191 days.

(21) Appl. No.: 15/470,086

(22) Filed: Mar. 27, 2017

(65) Prior Publication Data

US 2017/0277966 A1 Sep. 28, 2017

Related U.S. Application Data

(60) Provisional application No. 62/313,920, filed on Mar. 28, 2016.

(51) Int. Cl.
  *G06K 9/32* (2006.01)
  *H04N 5/33* (2006.01)
  *G06T 7/00* (2017.01)
  *G06T 7/13* (2017.01)
  *G06K 9/46* (2006.01)

(52) U.S. Cl.
  CPC ......... *G06K 9/3233* (2013.01); *G06K 9/4638* (2013.01); *G06T 7/001* (2013.01); *G06T 7/0008* (2013.01); *G06T 7/13* (2017.01); *H04N 5/33* (2013.01); *G06T 2207/10048* (2013.01)

(58) Field of Classification Search
  CPC .. G06K 9/3233; G06K 9/4638; G06K 9/4604; G06K 9/4671; G06K 9/629; H04N 5/33; H04N 5/23293; G06T 7/0008; G06T 7/13; G06T 7/0001; G06T 7/001; G06T 7/10–12; G06T 7/174; G06T 7/181; G06T 2207/20021; G06T 2207/10048;
  (Continued)

(56) References Cited

U.S. PATENT DOCUMENTS 6,606,115 B1  8/2003 Alicandro et al.
7,457,441 B2 * 11/2008 Hartlove ............ G06K 9/00369
                                                382/117
(Continued)

OTHER PUBLICATIONS

"Research on Solar Panels Online Defect Detecting Method"; Wang Yali; Applied Mechanics and Materials vols. 635-637 (2014) pp. 938-941 (Year: 2014).*
(Continued)

*Primary Examiner* — Michael S Osinski
(74) *Attorney, Agent, or Firm* — LKGlobal | Lorenz & Kopf, LLP

(57) ABSTRACT

Methods and systems are provided for detecting a defect in a solar panel. The method includes initially imaging, via an infrared camera, a group of solar panels. Then, identifying, via a computer system configured for solar panel defect detection, the individual solar panels in the group of solar panels. Finally, identifying, via evaluation of an infrared image obtained by the infrared camera, a defect in at least one of the group of solar panels.

12 Claims, 13 Drawing Sheets

(58) Field of Classification Search
CPC .......... G06T 2207/20104; G06T 2207/20061; G01N 25/72
See application file for complete search history.

(56) References Cited

U.S. PATENT DOCUMENTS

| | | | |
|---|---|---|---|
| 7,693,348 B2* | 4/2010 | Zavadsky | G06T 3/4038 |
| | | | 382/145 |
| 8,373,758 B2 | 2/2013 | Guha et al. | |
| 8,560,972 B2* | 10/2013 | Wilson | G06F 3/04883 |
| | | | 345/156 |
| 8,842,878 B2 | 9/2014 | Dimov et al. | |
| 8,874,454 B2* | 10/2014 | Plummer | G06Q 40/00 |
| | | | 705/4 |
| 9,412,015 B2* | 8/2016 | Ishida | H04N 5/23293 |
| 2002/0128797 A1 | 9/2002 | Sun | |
| 2005/0252545 A1 | 11/2005 | Nowlan et al. | |
| 2007/0181180 A1* | 8/2007 | Chou | G01N 21/3563 |
| | | | 382/145 |
| 2009/0238444 A1 | 9/2009 | Su et al. | |
| 2011/0001809 A1* | 1/2011 | McManus | G01J 5/02 |
| | | | 348/61 |
| 2011/0205394 A1 | 8/2011 | Fuchigami | |
| 2012/0121128 A1 | 5/2012 | Lawrence et al. | |
| 2013/0128001 A1* | 5/2013 | You | G06K 9/00208 |
| | | | 348/47 |
| 2013/0182935 A1* | 7/2013 | Wang | G06K 9/3233 |
| | | | 382/133 |
| 2014/0362248 A1* | 12/2014 | Ishida | H04N 5/23293 |
| | | | 348/222.1 |
| 2015/0138610 A1 | 5/2015 | Xie et al. | |
| 2016/0104054 A1* | 4/2016 | Lin | G06K 9/4671 |
| | | | 382/192 |
| 2016/0321507 A1* | 11/2016 | Yang | G06K 9/00778 |
| 2017/0083748 A1* | 3/2017 | Zhou | G06K 9/4671 |
| 2017/0109599 A1* | 4/2017 | Gupta | G06K 9/4652 |
| 2018/0300865 A1* | 10/2018 | Weiss | G06T 7/001 |
| 2019/0114756 A1* | 4/2019 | Weiss | G06T 7/001 |
| 2019/0114775 A1* | 4/2019 | Ma | G06T 7/11 |

OTHER PUBLICATIONS

"Analysis on Solar Panel Crack Detection Using Optimization Techniques"; Dafny Lydia; Journal of Nano- and Electronic Physics vol. 9 No. 2, (2017) (Year: 2017).*

United States International Searching Authority, International Search Report and Written Opinion in International Application No. PCT/US2017/024294 dated Jul. 17, 2017.

* cited by examiner

| | Total | Detected | Missed | False Alarm | $P_d$ | $P_{fa}$ |
|---|---|---|---|---|---|---|
| Modules | 12800 | 12537 | 263 | 8 | 97.90% | 0.06% |
| Local Defects | 35 | 28 | 7 | 21 | 80% | 0.16% |
| Hot Modules | 78 | 76 | 2 | 29 | 97.40% | 0.23% |

SYSTEM AND METHODS FOR AUTOMATIC SOLAR PANEL RECOGNITION AND DEFECT DETECTION USING INFRARED IMAGING

CROSS-REFERENCE TO RELATED APPLICATIONS

This application claims the benefit of U.S. Provisional Application No. 62/313,920, filed Mar. 28, 2016, which is incorporated herein by reference in its entirety.

TECHNICAL FIELD

The present invention generally relates to automatic assessments of solar panels, and more particularly relates to systems and methods for automated panel recognition, defect detection and analysis using various image processing techniques on sequences of images of groups of solar panels captured in real-time by an infrared camera.

BACKGROUND

The demand for solar electric power has increased and this increased demand has resulted not only in more utility-scale solar photovoltaic (PV) power plants becoming operational but also a larger number of PV arrays being used at these PV power plants to meet the increased demand. Hence, because of the larger PV arrays being used, there is a multiple factor uptick in the use of solar panels which make up the PV arrays used in the solar electric power generation. Therefore, these large solar farms that have become operational and generating greater amounts of electrical power is in fact due to voluminous numbers of individual solar panels each contributing to the overall power generations by the PV arrays of these plants.

Initially, during the manufacturing process, PV panels need to be inspected for defects such as cracks and hot spots. After PV arrays are installed in a utility-scale solar plant and operational periodic inspection are still needed to identify defects. It is important that all the panels in an array are working properly together to generate the maximum amount of electricity. That is, power output decreases when individual cells or panels malfunction due to a variety of reasons such as defects in manufacturing, age, or operational damage. These malfunctioning panel usually emit more heat as compared to a normally functioning panel because it converts less luminous energy directed at the panel into electrical energy resulting in thermal radiation to dissipate causing the resultant heat. Hence, efficient operation of solar panels requires the panels to operate failure free and affects the overall efficiency of commercial solar plants where commercial feasibility and profitability requires the plants to operate at high efficiencies.

To achieve higher power generation efficiency and longer panel life, a simple and reliable panel evaluation and defect ascertainment method and system is therefore desirable. Thermal infrared imaging combined with image processing techniques provides an approach to achieving this desired goal rather than the use of conventional electrical detection circuitry and other similar prior approaches which all suffer numerous drawbacks which include being expensive, time-consuming and inefficient in implementation. Accordingly, improved systems and methods for using IR imaging for solar panel and solar panel array assessment and defect detection are desirable.

Accordingly, it is desirable to have improved solutions for detecting defects in solar panels using IR imaging for detecting defects in groups of solar panels of the PV arrays and individual solar panels. In addition, it is desirable to use image processing solutions in conjunction with IR image capturing to provide real-time processing for panel recognition and defect detection of defects in solar panel arrays and individual solar panels.

In addition, it is desirable to use image processing techniques of the captured IR images that require limited prior information to perform associated processes used in the image processing of filtering and segmentation of the captured images for the panel recognition and the subsequent defect detection of the defects in the plurality of solar panels of the PV arrays and individual solar panels.

It is also desirable to detect defects by automatically capturing IR images or streams or imagery by an IR camera mounted on different vehicles such vehicles conventionally used for inspections of panels in solar farms, for vehicles that may have autonomous capabilities for navigating the solar farms and for remote drones where in each case the mounted camera may provide real-time information to a user locally or remotely via cloud based applications for inspections by inspectors at the site or remote sites or other locations for convenience and efficiency. In addition, it is desirable to utilize machine learning and artificial intelligence applications to aid in identifying and locating detected defects without user involvement adding to the automation and efficiency of the defect detection process.

It is desirable to use data analysis to identify in real-time local hot regions and related defects in individual panels as well as thermal IR differences among panels in pluralities of panels in PV arrays for entire panel failures using algorithmic solutions related to clustering of the data received, comparisons of pixels within IR images of individual panels and comparisons of mean IR thresholds values of entire panels with other thermal IR panel values in a PV array.

It is desirable to generate identification information of each panel captured by IR imagery and to track and locate the individual panels using the generated identification information in a PV array in association with the defect detection identification identified with the individual panel.

It is desirable to not require training of panel assessment systems and to adjust in real-time for adverse effects that may affect the panel recognition and defect detection including missing rows of panels in IR images captured of the PV array, failures in initialization of counters associated with panel identification and failures in image registration.

Furthermore, other desirable features and characteristics of the present disclosure will become apparent from the subsequent detailed description of the invention and the appended claims, taken in conjunction with the accompanying drawings and this background of the invention.

SUMMARY

Method and systems are provided for detecting a defect in a solar panel. The method includes imaging, via an infrared camera, a group of solar panels. Then, identifying, via a computer system configured for solar panel defect detection, the individual solar panels in the group of solar panels. Finally, identifying, via evaluation of an infrared image obtained by the infrared camera, a defect in at least one of the group of solar panels.

BRIEF DESCRIPTION OF THE DRAWINGS

The present invention will hereinafter be described in conjunction with the following drawing figures, wherein like numerals denote like elements.

in FIG. 9A line detection processing, in FIG. 9B horizontal and vertical line filtering, in FIG. 9C numbering of borders and vertical borders and intersections, and in FIG. 9D numbering panels of an exemplary solar panel assessment system in accordance with an embodiment;

in FIG. 12A panel recognition results of a captured IR image sequence, in FIG. 12B frame motion in a rightward direction, pausing of frame motion, in FIG. 12C frame motion in an opposite leftward direction, and in FIG. 12D frame motion reverting to a rightward direction of an exemplary solar panel assessment system in accordance with an embodiment;

DETAILED DESCRIPTION

The following detailed description is merely exemplary in nature and is not intended to limit the invention or the application and uses of the invention. Furthermore, there is no intention to be bound by any theory presented in the preceding background or the following detailed description. The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from principles of the present disclosure.

For the sake of brevity, conventional techniques for solar panel defect detection, manufacturing, repair, replacement, and/or the like may not be described in detail herein. Furthermore, the connecting lines shown in various figures contained herein are intended to represent exemplary functional relationships and/or physical or communicative couplings between various elements. It should be noted that many alternative or additional functional relationships may be present in a practical solar panel assessment system.

Additionally, the term "solar panels" is used in conjunction with the terms "solar modules", "panels" and "modules" in the disclosure and are considered to encompass the same subject matter. In other words, references to "solar panels", "panels", "solar modules" or "modules" have the same technical meaning and are commonly used interchangeably in the art. Hence, the terms "solar panel", "solar module", "module" and "panel" may be used interchangeably when used in the context of referring to a solar panel.

The terms "local defect", "local anomaly", local defects", "local anomalies" are too similar in technical meaning but for a singular or plural form and can be considered interchangeable if used in the same context. Likewise, the terms "global defect", "global anomaly", "global anomalies" and "global defects" are also considered similar in technical meaning but for a singular and plural form and can considered interchangeable if used in the same context.

Figure 1:
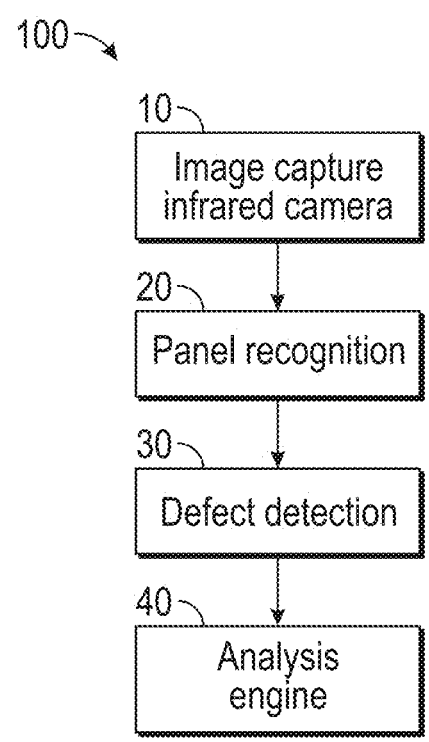
FIG. 1 illustrates a block diagram of operations of processing modules for image capture, panel recognition, defect detection and data analysis of an exemplary solar panel assessment system in accordance with an embodiment.

Disclosed herein is a solar panel assessment system of a panel recognition system and defect detection system, which automates the inspection process and mitigates the need for manual panel inspection in a large solar farm. With a reference to FIG. 1, FIG. 1 illustrates a block diagram of operations of processing modules for image capture, panel recognition, defect detection and data analysis of an exemplary solar panel assessment system in accordance with an embodiment. In FIG. 1, the solar assessment panel assessment system 100 includes an image capture by an IR camera module 10 where infrared raw video of image frame sequences of images of each array of solar panels are initially captured by an IR camera mounted to a moving vehicle, which is navigated in a parallel pattern in rows next to each PV array until the IR camera module 10 has been navigated past all the PV arrays in a solar farm. The panel recognition module 20 includes image processing algorithmic solutions for processing image sequences of solar panels in real time, with only requiring a user to input a limited amount of data of only the height of the array (specified as the number of rows of panels in the array) as prior information to aid in an image segmentation process of the captured images. In order to "count" the number the panels within any given array, frame-to frame panel association is established in parallel using optical flow metering with related steps of the image processing process of the panel recognition module 20.

With a continued reference to FIG. 1, a defect detection module 30 detects local anomalies in a single panel such as "hotspots" and cracks in a substantially instantaneous time frame without the user noticing any delays as soon as the panel is recognized in the field of view. That is, once the panel is in the field of view of the IR camera module 10 and upon IR image capture of the array and panel recognition which likewise is executed by instructions in a substantially instantaneous manner, the defect detection module 30 executes additional instructions substantially instantaneously in conjunction to detect local anomalies and add labeling information to the detected anomaly so that the user is given notice of the defect on the display of a mobile device (not shown) within an instance of the panel being recognized in the field of view. Hence, while the IR camera module 10 passes solar arrays within the field of view of the camera, a user monitoring the display of the mobile device would be able to in nearly real-time be given notice of defects in the panels as there would not be any perceptible delay or latency in processing which the user could discern.

The defect detection module 30 is configured to detect differences in temperature by using applications related to infrared thermography for analyzing these temperature differences from outputs of data from the IR camera. In an exemplary embodiment, while keeping the solar array farm online and generating solar energy power, the defect detection module 30 is configured to, using infrared thermography applications for analyzing data extracted from captured imagery by the IR camera module 10 and detect the heat differential between solar panels in the PV array. Using such internal IR thermography related applications, the defect detection module 30 can determine whether any of these panels are damaged or defective because the characteristics of a malfunctioning panel are readily discernable; the malfunction panel usually emits more heat as compared to a normally functioning panel because it converts less luminous energy into electrical energy.

After the data from an entire array is collected, hot panels are detected by the analysis engine module 40 using, in this instance a density-based spatial clustering of applications with noise DBSCAN. Though it should be understood that there are a variety of "clustering" techniques available that may be used and DBSCAN is simple one such clustering technique available and elected herein. For example, a clustering technique known as ordering points to identify the clustering structure OPTICS is an alternate to DBSCAN; each clustering technique has strengths and weaknesses that must be weighed in implementation but both address similar problems and therefore have a degree of interexchange ability. An advantage to using clustering techniques by the analysis engine module 40 is that no training data is required. The analysis engine module 40 "learns" which panels are defective automatically by use of clustering and other related algorithms and further, retains such "learning" data in memory for use in later analysis hence increasing the overall panel recognition and defect detection capabilities of the panel assessment system.

Figure 2:
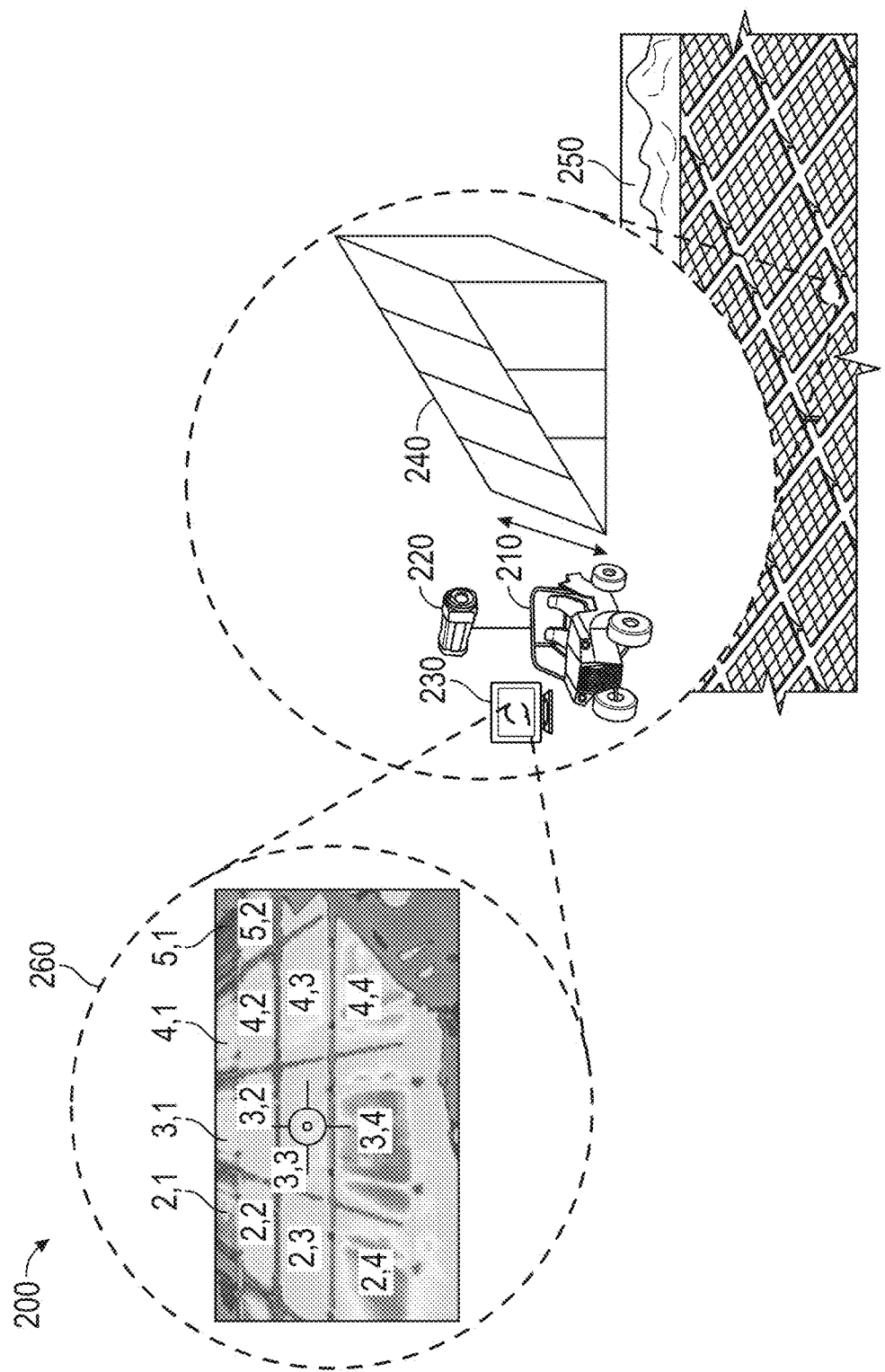
FIG. 2 illustrates a diagram of an IR camera mounted on a vehicle for automatically recognizing PV panels and detecting anomalies within a PV array of an exemplary solar panel assessment system in accordance with an embodiment.

With a reference to FIG. 2, FIG. 2 illustrates a diagram of an IR camera mounted on a vehicle for automatically recognizing PV panels and detecting anomalies within a PV array of an exemplary solar panel assessment system in accordance with an embodiment. In FIG. 2 a vehicle 210 is mounted with an IR camera 220 which is coupled (via Wi-Fi or the like) to a mobile device 230 for viewing images captured with in the field of view of the IR camera 220. The IR camera 220 is positioned in a vertical upright manner so that the IR Camera 220 can capture all the rows of a PV array 240. As the vehicle 210 is driven past the PV arrays 240 in the solar plant farm 250, the user can view images captured by the IR camera 220 on the mobile device 230. The mobile device 230 has a display 260 which shows captured IR images of the panels and enables the user to identify in "hot spots" in real-time of local anomalies in individual panels and "hot modules" of global anomalies between panels in the PV array 240 by thermal characteristics being displayed on a user interface in the display 260 of the mobile device 230.

While a vehicle 210 is shown to mount the IR camera 220, any device capable of mounting an IR camera 220 and navigating pass the PV arrays 240 and positioning the IR camera 220 so that the IR camera 220 has an up right field of view of the PV array 240 will suffice. For example, autonomous vehicles, robotic type devices, as well as aerial devices may be used to capture IR images of the PV arrays 240 so long as the alternatives are capable of properly positioning the IR camera 220 in an upright manner so the field of view can encompass all the rows aligned together across the PV array 240 at once. Additionally, a host of different mobile devices 230 including laptops, tablets, smartphones, Google Glass™, and any other computing device implemented in an automobile, aircraft, or other business or consumer electronic device or system may be configured for use so longer as the device has sufficient processing and display capabilities.

In an exemplary embodiment, a set of "use" configurations for the IR camera 220 and mobile device 230 are as follows: IR video sequences are collected in the field at a PV solar farm were test sequences were composed of 16-bit IR imagery taken from IR camera 220 of a FLIR® A325sc camera mounted on a vehicle 210 which is a motorized cart, and all the PV arrays are four rows in height. The original image resolution is 640×480 pixels of the display 260 and the frame rate was 30 frames per second (fps). The frames are down sampled to 320×240 pixels for real-time image processing. The image format in the panel recognition module is a single-channel, 8-bit grayscale imagery as it is better supported by the computer vision tools of an OPENCV™ software package, whereas in the defect detection module, the original 16-bit-depth imagery is used. The dataset collected includes adverse scenarios relating to IR image capture of motion blur, video freezing, sun reflection, shadowing on the panels, and fast-moving frames. The assessment system is implemented in C++ with OPENCV™. The average processing times of processors, of the mobile device 230, per frame is in the vicinity of a speed below 32 ms (on a PC with an INTEL® i5-2400 CPU running at 3.1 GHz and 8 GB of RAM), which enables a real-time module recognition at 30 fps. The average processing time for clustering 480 PV modules (at the end of each array) is 140 ms.

Figure 3A:
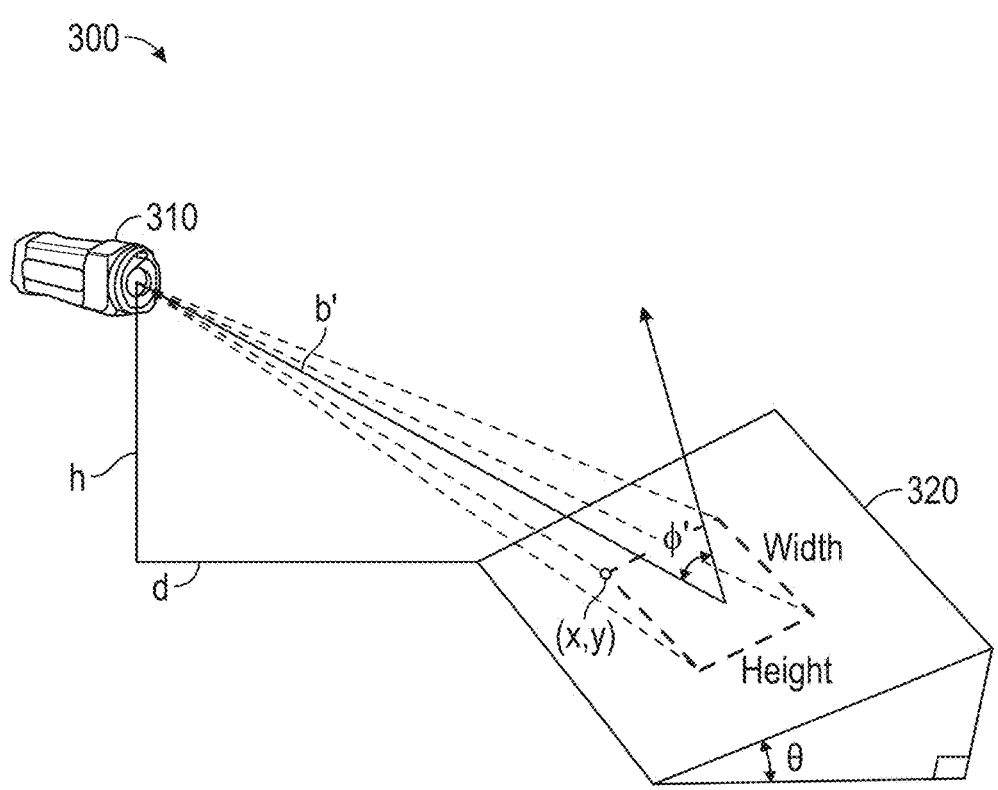
FIGS. 3A-B illustrate in diagrams in FIG. 3A the field of view of an IR camera positioned in front of a PV array and emissivity attributes, and in FIG. 3B a user interface displaying the emissivity attributes on a display of a mobile device for viewing and adjusting in real-time by a user of an exemplary solar panel assessment system in accordance with an embodiment.
Figure 3B:
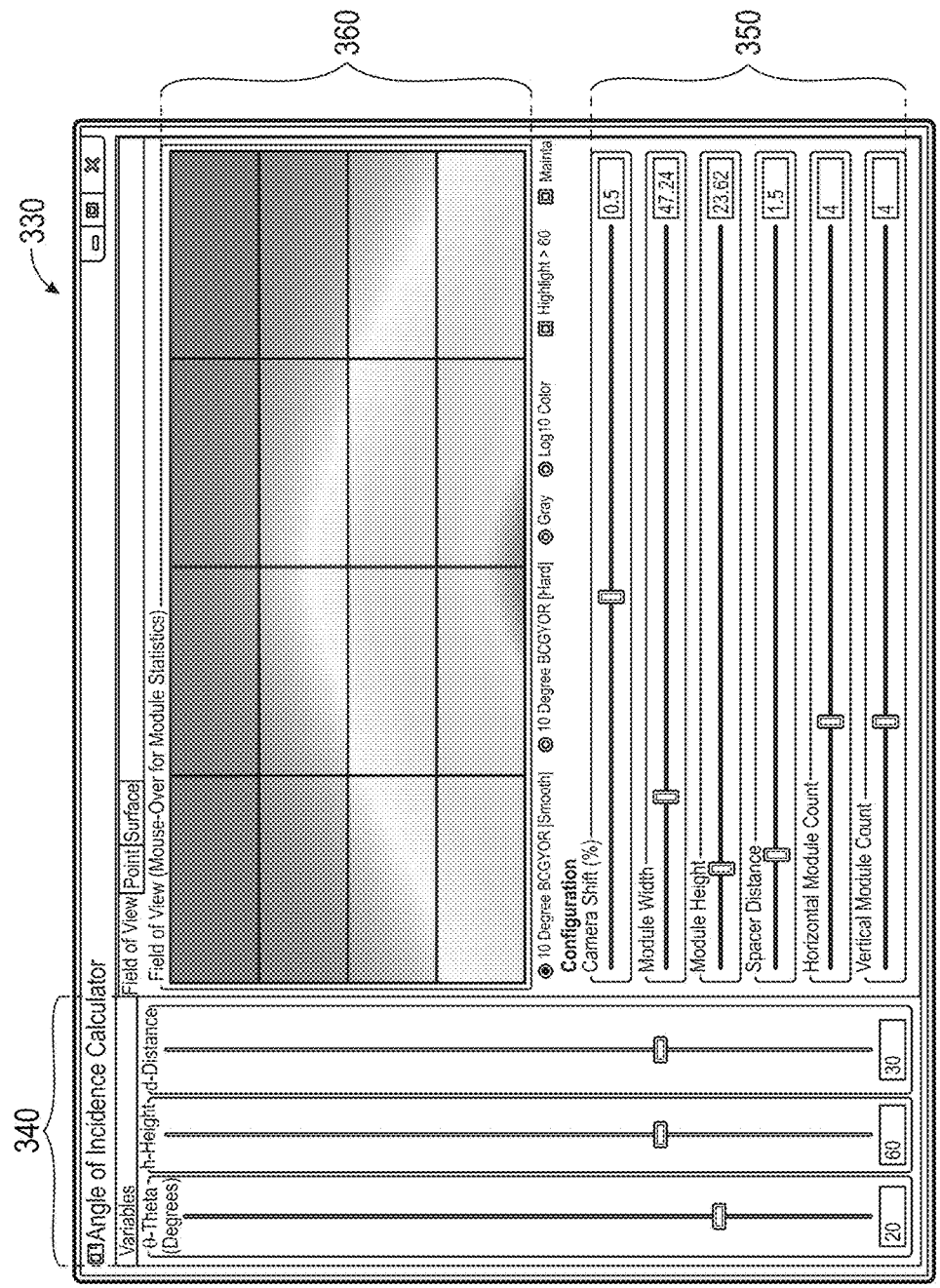

With a reference to FIGS. 3A-B illustrate in diagrams in FIG. 3A the field of view of an IR camera positioned in front of a PV array and emissivity attributes, and in FIG. 3B a user interface displaying the emissivity attributes on a display of a mobile device for viewing and adjusting in real-time by a user of an exemplary solar panel assessment system in accordance with an embodiment.

In FIG. 3A, the field of view of the IR image capture 300 includes an IR camera 310 and PV array 320. There are many attributes that are required to be considered relating to IR image capture for optimum performance of the image processing applications of the panel recognition and defect detection modules to be applied effectively. In an exemplary embodiment, attributes of the IR camera 310 include camera angle and skew, horizon and distance to PV array 320, and focus and zoom. In addition, in FIG. 3B emissivity attributes as shown in the user interface 330 of the display of the mobile device (not shown), section 360 renders color gradients of hues of thermal characteristics relating to data about emissivity from the panels. For example, factors such as temperature of the panels and environmental conditions as well high intensity reflectance affects the emissivity. The user interface 330 includes variable selectors in section 350 for adjusting and displaying metrics associated with the PV array 320 such as camera height, module height, module width, space distance, horizontal and vertical module counts. In addition, in section 340 the calibration setting for the IR camera 310 are displayed which include theta, height and distance effecting the IR camera 310 field of view. The user may, in instances, make changes or adjustments to these setting to avoid obstructions or other occlusions that appear in the field of view. In instances when the IR camera 310 is mounted on an all-terrain vehicle ATV sometimes parts of the roll cage block aspects of the field of view and camera adjusts are required. The user interface 330 allows the user to make the adjustments in real-time upon perceiving such obstructions or occlusions or missing rows of panels etc. in the field of view. In addition, the user can monitor the module count in section 350, from which the user can gauge the vehicle speed and image acquisition in a forward or reverse direction and make decisions as to how to proceed with the image capture throughout the image capture process without having to be concerned about missing panels.

Figure 4:
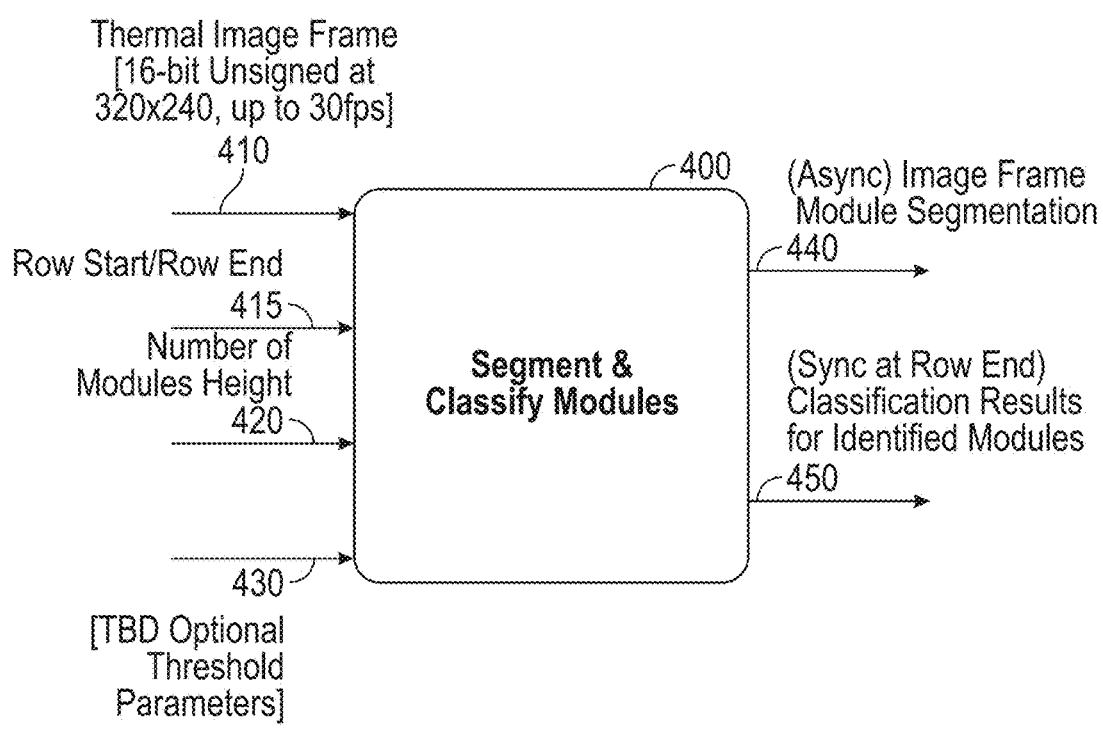
FIG. 4 illustrates in a block diagram of a segmentation and classifying processing module of an image processing system of an exemplary solar panel assessment system in accordance with an embodiment.

With a reference to FIG. 4, FIG. 4 illustrates in a block diagram of a segmentation and classifying processing module of an image processing system of an exemplary solar panel assessment system in accordance with an embodiment. The panel assessment system in the instant disclosure uses object recognition algorithms which focuses in two area the features and the classifier. The features include a relatively small set of values that can be used to represent the target in a feature space. The classifier can be considered a term for any algorithm that can distinguish between targets and non-targets in the feature space. The features that are commonly used in target recognition include corners, edges, colors, and blobs. The source images received by the segment and classify module 400 in the present disclosure were originally received at the onset in a 16-bit single-channel IR image 410 that was converted to 8-bit single-channel for grayscale images. Because of motion blur as a result of movement of the IR camera, a limited number of reliable features can be used in these grayscale images which results in smaller feature set. This feature set includes input 415 of row start and end, input 420 of number of modules, and input 430 which is designated as an optional input. The image frame module segmentation is processed asynchronously at output 440 while the classification results are synchronized at the end of each row for the identified modules at output 450. For the image frame module segmentation at output 440, dark shadow in the capture IR images formed by gaps between the panels are reliable indicators of panel edges.

It is worth contrasting different target recognition methods that often treat individual objects independently. For example, in pedestrian detection, if one pedestrian is identified, it will not increase the probability that other nearby objects will be recognized as a pedestrian. In addition, unlike other target recognition problems, there does not exist any quantified models for the targets in the detection of solar panels. This is because unlike pedestrian recognition, solar panel recognition has raised difficulty due to the lack of features associated with individual panels. Therefore, recognizing individual PV modules is difficult and error-prone and often making a singular mistake in the panel numbering can make the defect detection problem intractable; the panel assessment system of the present disclosure compensates for intractable problems by using a single pass methodology. That is, in a single pass the detecting process of the entire array of panels is performed rather than performing incremental detections of each individual panels one after another. Hence, by detecting all the panels in a PV array at once, the likelihood that an incremental mistake is made in reduced as the entire data set is captured from the entire set of IR images in a singular one step pass.

Figure 5:
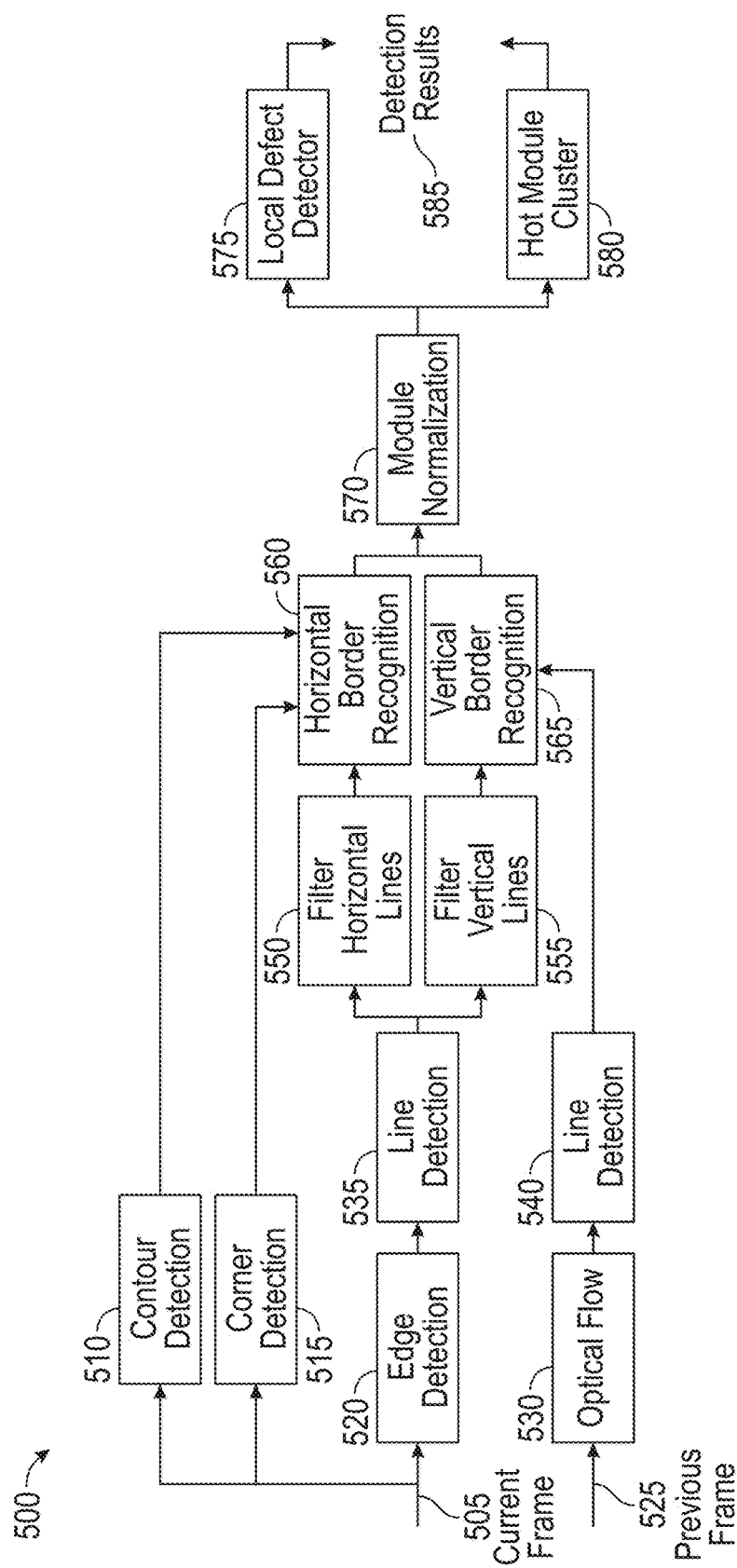
FIG. 5 illustrates in a block diagram segmentation, classification, optical flow, defect detection, and clustering processing modules of an exemplary solar panel assessment system in accordance with an embodiment.

With a reference to FIG. 5, FIG. 5 illustrates in a block diagram segmentation, classification, optical flow, defect detection, and clustering processing modules of an exemplary solar panel assessment system in accordance with an embodiment.

The assessment system 500 incorporates two major systems: a panel recognition system and a subsequent defect detection system. In the panel recognition system, a current frame of a captured IR image is received at 505, then an edge detection module 520 extracts edges from the IR frame received. Next, line detection module 535 applies algorithmic solutions comprising Hough Transform (HT) algorithms to detect lines after receiving output from the edge detection module 520 of data of edges extracted from the incoming frame at 505. All line segments detected by using the HT algorithms of the line detection module 535 are further extended to connect to lines across the entire image frame. The detected lines are filtered by a horizontal line filtering module 550 and a vertical line filtering module 555 and are divided into two groups of horizontal lines and vertical lines. The HT algorithm combines closely spaced lines into one line That is, if the distance between two lines is smaller than a threshold, then these lines are considered the same line and an "average line" will be calculated from both line positions. After merging these closely spaced lines, all the vertical and horizontal lines are sorted per associated line positions within the frame (e.g., from left to right, from top to bottom). These sorted line positions with associated position are then determined as the line "candidates" of the actual lines.

The actual positions of the horizontal and vertical lines are then estimated, with false positions being removed and the position of missing lines being estimated based upon the lines from the previous frame. That is, a best match is determined by the horizontal line filtering module 550 and the vertical line filtering module 555 and "learned information" is used from previous frames from line detection module 540 in the estimations.

In addition to the line detection process in each frame, all lines are numbered and tracked across multiple frames by the optical flow module 530 and line detection module 540. The horizontal border recognition module 560 and vertical border recognition module 565 determines a location of an individual panel from an intersection of the vertical line and horizontal line since each intersection corresponds to the corner of a panel.

Additional corner information is received by corner detection module 515 as well as contour information from contour detection module 510. By connecting four nearby corners using algorithms of the horizontal border recognition module 560 and vertical border recognition module 565, the boundaries of a panel are defined.

The corner detection module 515 and contour detection module 510 are two additional features that are used in the algorithm solution as explained earlier horizontal lines are difficult to recognize with a high degree of accuracy. That is, blurry frames often captured can prove to be problematic to the line detection modules 535, 540, especially when there are no clear edges that separate the top row or the bottom row from the background of the captured IR image. The corners are usually aligned on panel edges, so missing lines can be estimated if multiple corners are aligned along a line. The contour detection is based upon a line segment mapping performed. Additionally, contours detected by contour detection module 510 that have rectangle-like shapes will be recorded.

With continued reference to FIG. 5, the defect detection system, after normalizing the data for the identifying panels by normalizing module 570, detects local anomalies and global anomalies. The data of the panels requires normalizing, as in instances, the panels defined may not be of rectangular but trapezoidal configurations. Hence, by applying various normalization algorithmic solutions by the normalizing module 570 preprocessing and down sampling of the panel module border data is performed. The local defects are small defects within individual panels and global anomalies are considered as complete panel failures.

The local anomalies or small defects, such as hot spots and cracks, are detected locally by examining consecutively one panel at a time by a local defect detector module 575. Like anomaly detection which examines defects on a texture surface, local anomalies are examined with local feature extraction and classification being employed. However, in global anomalies of complete panel failure, identification of complete panel failure can only be discerned by identifying "hot panels". Such "hot panels" are determined by comparisons of the neighboring panels IR thermal characteristics in relation to a selected panel. In other words, by comparing a panel to its neighboring panels and finding differences in IR thermal characteristics, then only can "hot panels" be identified and the subsequent global anomaly identified.

Therefore, to efficiently make such comparisons between panels, the panel assessment system uses DBSCAN clustering algorithms in hot module cluster module 580 of the IR thermal data received to find a mean temperature readings of all panels within the same row. If more than one cluster is created, the panels belonging to the cluster(s) with the higher temperature are classified as hot modules. The detection results are outputted at 585 and often combined for presenting combined local and global anomalies associated with panels and PV arrays.

Figure 6:
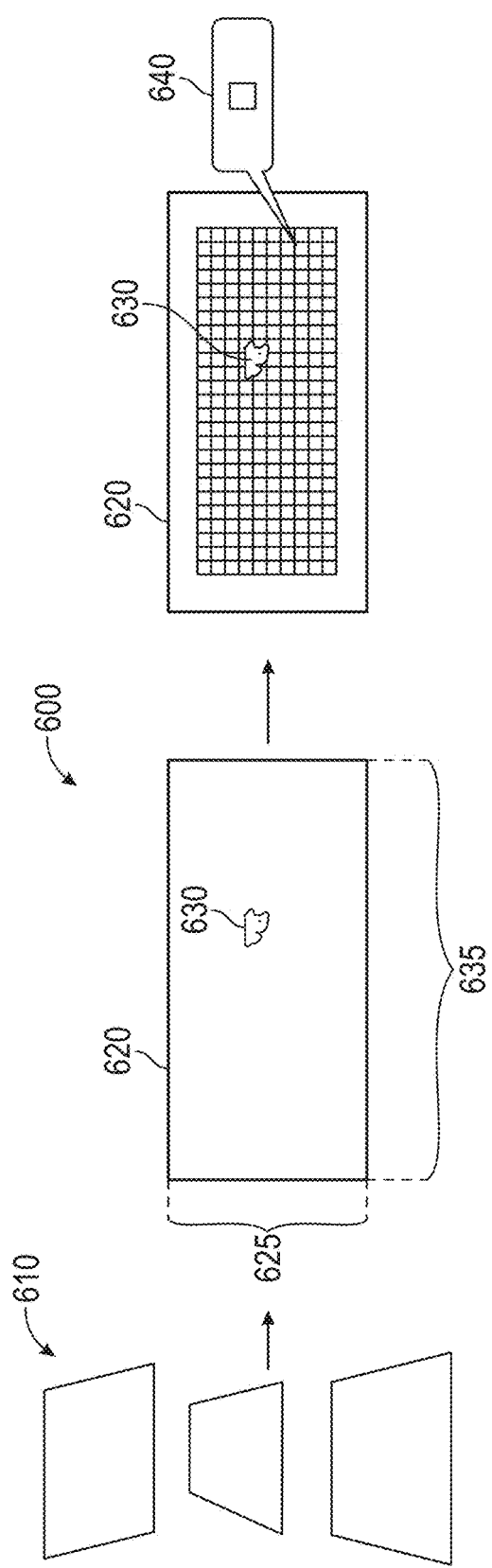
FIG. 6 illustrates a diagram of hot region detection for local anomalies within each panel using an adaptive threshold of an exemplary solar panel assessment system in accordance with an embodiment.

With a reference to FIG. 6, FIG. 6 illustrates a diagram of hot region detection for local anomalies within each panel using an adaptive threshold of an exemplary solar panel assessment system in accordance with an embodiment. The defect detection system has a main goal to pinpoint different types of anomalies in a numbered array of PV panels identified by the panel recognition system. As mentioned, the local anomalies are small defects that only occupy a small area within a panel like cracks and hotspots. These local anomalies can be detected locally by pixel-level detection algorithms by comparing neighboring pixel values. In contrast, global anomalies are usually referred to as hot modules or "string outs" (a set of connected modules that are malfunctioning), where the entire module is warmer than it should be for proper operation. The global anomalies can only be detected by panel-level comparisons, e.g., by comparing the mean values of all panels in a row. Then, by combining the results from both local anomaly detection and global anomaly detection yielding a finalized result.

With a continued reference to FIG. 6, the panels 610 are defined by the coordinates of the panel's four corners in the image plane. For example, the panels 610 are trapezoidal in shape and not rectangular. This is often the case and is due to differing angles and distances when the IR image capture is performed from the PV array and subsequent extraction of the panel configuration data. Hence, the various shapes of trapezoids or more generally quadrilaterals are defined by only four corners and need to be normalized to share the same shape and size for further processing and comparisons. Accordingly, they are warped using algorithmic solutions for normalization into 120 pixels (at 635) by 60 pixels (at 625) rectangles 620 as shown in FIG. 6. This 2:1 width-to-height ratio is approximated from the actual size of the PV modules in operation. The edge pixels are removed and the size of the rectangle is reduced to 100 pixels by 40 pixels as shown in FIG. 6 to avoid erroneous or poor segmentation processes performed at the edges. The rectangle is then down sampled to a 25×10 grid where each sample represents a 2×2 block shown in 640. Additionally, a hot region detection of a local anomaly 630 is performed by samples of the individual panel being compared using an adaptive threshold. A "hot region" is defined as neighboring samples with higher pixel values than the rest of the panel.

As explained, the defect detection system uses adaptive thresholding to find local anomalies in the 25×10 sample grid after the panels are recognized in each frame. Algorithm 1 lists the complete procedure. The threshold is calculated by adding the median and multiples of the standard deviation of all sample means. Any sample that has a mean larger than the threshold is considered abnormal. If a panel contains more than two such abnormal samples, then it is marked as having "local anomalies detected." This baseline algorithm is a straightforward algorithm for comparisons therefore the adaptive threshold can provide some flexibility in practice. However, the algorithm does not take advantage of other features like shapes but additional algorithms can be added if shapes need to be addressed. Below, the Algorithm 1 listed shows the calculation of the adaptive threshold based on a median in the array and s standard deviations and uses an incremental counter to make comparisons of all samples in the array.

---

Algorithm 1: Local anomaly detection by adaptive thresholding 1  function LocalDetect (modules);
   Input : An array of modules detected in current frame modules
   Output: Boolean TRUE for anomaly detected, FALSE for undetected
2  foreach modules do
3  | compute sample means as array m;
4  | med = MedianInArray(m);
5  | std = StandardDeviationInArray(m);
6  | compute threshold th = med + 3std;
7  | count = 0;
8  | foreach m do
9  | | if m > th then
10 | | | count = count + 1;
11 | | end Algorithm 1: Local anomaly detection by adaptive thresholding

```
12  |  end
13  |  if count >= 2 then
14  |  |  return TRUE;
15  |  else
16  |  |  return FALSE;
17  |  end
18  end
```

Unlike local anomaly detection that applies detection applications for every incoming frame, global anomaly detection is only performed after the entire row of panels has been imaged and received. In operation, if a panel is hotter than other panels in the same row, it is malfunctioning because when operating, the panel is operating at a deficiency and failing to convert the same amount of solar energy into electric energy as the other panels.

In an exemplary embodiment, the PV array is four panels high, i.e., there are four parallel rows of panels. The lower rows of the PV array tend to have higher temperatures than upper rows because lower rows have better emissivity with respect to the IR camera position. Hence, when detecting global anomalies, the detection is performed separately on a row-by-row basis as each row has distinct different levels of emissivity. In sequences of PV array panel IR captured, the panel images are imaged in several consecutive frames but only the frame in which the panel image is centered the greatest from among the series of images captured is used for analysis. All the pixel values received within a panel in IR 16 format are processed and used in calculating measurements for the clustering analysis. After feature extraction, the problem becomes one of how to select the outliers in a group of data.

The global anomaly detection can be formulated as a classification solution (supervised learning) or a clustering solution (unsupervised learning). Classification algorithms are reliable when large numbers of features are available for use in the classification. This is because with a large feature set, a well-defined training dataset that covers many different situations is possible, and as such enables classification algorithms to be more precise when applied to large data sets. Clustering algorithms on the other hand have the advantage of requiring no prior training data and the decision boundaries are formed automatically by analysis of the data. Since emissivity of the modules varies as a function of time of day, time of year, IR camera position, and module location within the array, it is not feasible to assemble a consistent collection of training data, which makes clustering an attractive option. The present panel assessment system uses density-based spatial clustering of applications with noise (DBSCAN), which does not require any training or prior information and therefore meets the necessary requirements.

In an exemplary embodiment and referring to Algorithm 2 listed below, a set of points in a selected space are considered for clustering by using DBSCAN clustering. The points are classified as the following: core points, border points, and noise points and defined as follows: Core points: A point p is a core point if at least minPts points are within distance $\varepsilon$ of point p. Border points: A border point is not a core point, but falls within the neighborhood of a core point. Noise points: A noise point is any point that is neither a core point nor a border point.

Therefore, if p is a core point, then p forms a cluster together with all points (core or border) that are reachable from the point p. Each cluster contains at least one core point; border points may be part of a cluster, but are formed at the "border" since such points are not used to reach more points. The DBSCAN clustering algorithm only requires two parameters: distance $\varepsilon$ and minimum points minPts. In an exemplary embodiment, in an implementation $\varepsilon$ is set to 120 and minPts is 5. The decision boundary is calculated directly from the clusters as follows: Since the implementation only uses mean values in DBSCAN clustering algorithm, the clustering space is one dimensional and the decision boundary is simply a number. Any panel that has a mean value greater than the decision boundary is considered a hot module.

Algorithm 2: Global Anomaly Detection using DBSCAN

```
1  function GlobalAnomaly Detection (modules);
    Input : A module row modules, distance eps, minimum points min
    Pts
    Output: Labeled module row
2  clusters = DBSCAN(modules,cps,minPts);
3  foreach clusters do
4  |  mean = MedianInArray(clusters);
5  |  std = StandardDeviationInArray(m);
6  end
7  if NumOf(clusters) > 1 then
8  |  th = (mean(FirstCluster(clusters)) +
    |  mean(LastCluster(clusters)))/2;
9  else
10 |  th = mean(modules) + 3 std;
11 end
12 foreach module in modules do
13 |  if mean(module) > th then
14 |  |  Mark module as Hot Module;
15 |  else
16 |  |  Mark module as Unremarkable;
17 |  end
18 end
```

Figures 7, 8:
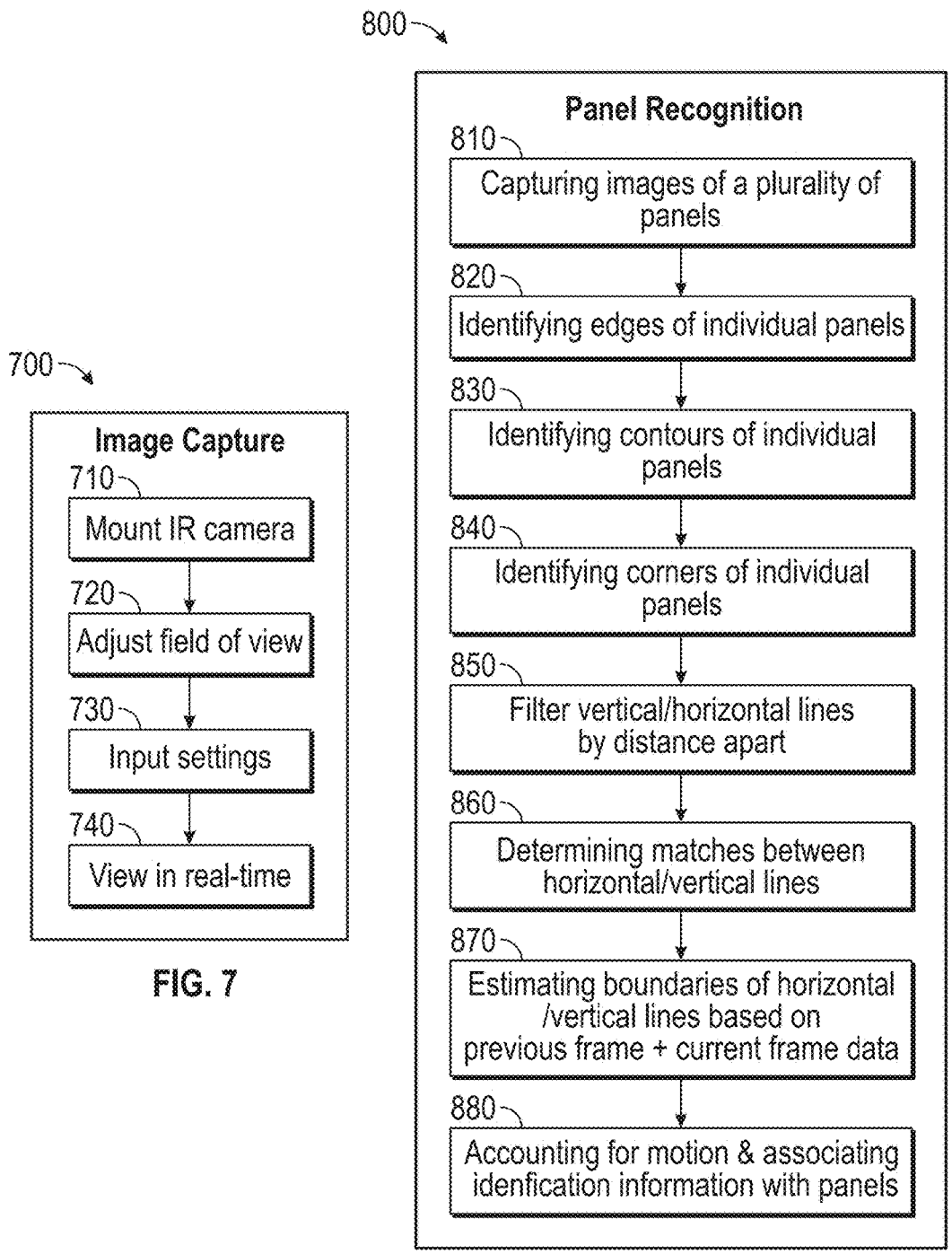
FIG. 7 illustrates a block diagram of the IR image capture process flow of an exemplary solar panel assessment system in accordance with an embodiment.
FIG. 8 illustrates a block diagram of the panel recognition process flow of an exemplary solar panel assessment system in accordance with an embodiment.

With a reference to FIG. 7, FIG. 7 illustrates a block diagram of the IR image capture process flow of an exemplary solar panel assessment system in accordance with an embodiment. In FIG. 7, the IR camera in initially mounted 710 on the vehicle or the like. Next, adjustments are made to the field of view at 720 so the top and bottom rows of the PV array are within the field of view and IR images captured include the top and bottom rows. At 730, a user inputs a limited set of initial metrics about the PV array such as the height and number of panels across. At 740, the user connects the mobile device and proceeds to view the IR images in real time so the user can make any adjustments if obstacles block the field of view. The user needs to activate the IR camera at the start of the row of the PV array and switch off the IR camera at the end of the row. However, in alternate embodiments, the assessment application will have learning functions and image recognition functions that enable this on/off process to be automated.

With a reference to FIG. 8, FIG. 8 illustrates a block diagram of the panel recognition process flow of an exemplary solar panel assessment system in accordance with an embodiment. At step 810, the IR camera capture a sequence of raw images of a plurality of panels in a row of an array. The IR image capture while using raw data may also use compressed image data such as MPEG, Motion JPEG etc. Next, at step 820, the edges of the individual panel are identified from extracted frame data of the captured IR images using edge detection algorithms of an edge detection processing module. At step 830, in parallel with the prior step 820, contours of the individual panels are identified using contour detection algorithms of a contour detection processing module; in addition, at this stage, at step 840 corners of the individual panels are identified using algorithms directed to corner detection by a corner detection processing module to compensate for errors in line detection being processed due to adverse effects such as motion deblurring, image blur etc. In step 850, filtering of the horizontal and vertical lines which have been detected is performed by a vertical and horizontal line filtering modules. Here, lines depending on far the lines are spaced apart are combined. That is at step 860, matching estimations are made between sets of horizontal and vertical lines for selected line locations on a panel in a captured image. Next at step 870, boundary estimates of horizontal and vertical boundaries based on previous frame and current frame are performed using boundary estimation algorithmic solutions and matched for additional accuracy with data derived from contour and corner identifications earlier. In parallel, accounting for motion of the IR camera passing the panels in the PV array, identification information is added to each of the individual panels in each row of the PV array so that the panel can be identified conveniently by the added identification information.

Figure 9A:
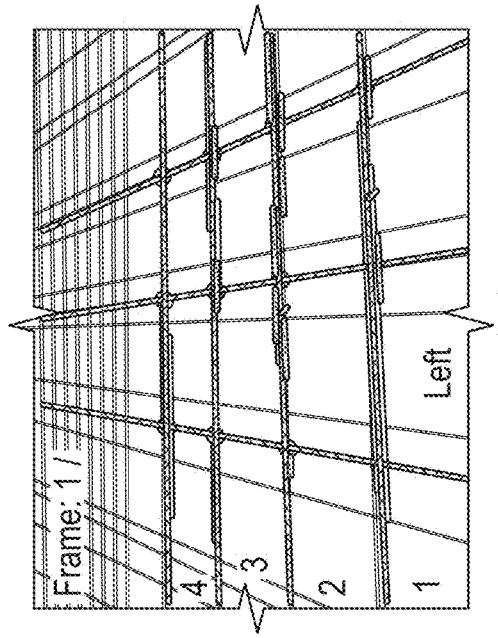
FIGS. 9A-D illustrate in diagrams as follows.
Figure 9B:
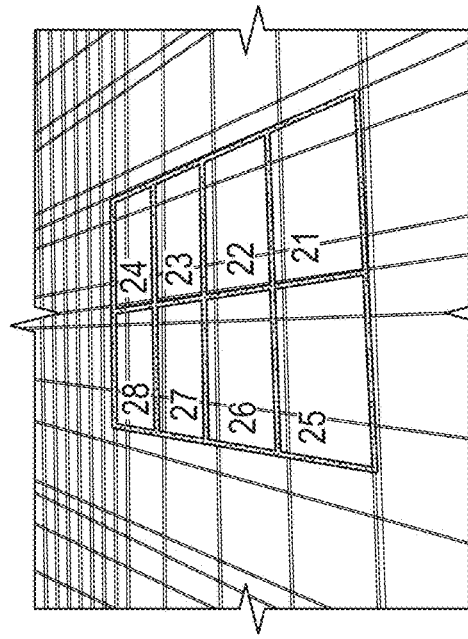
Figure 9C:
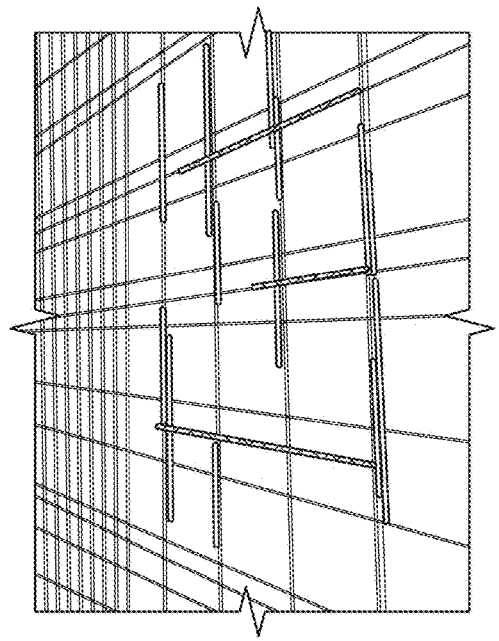
Figure 9D:
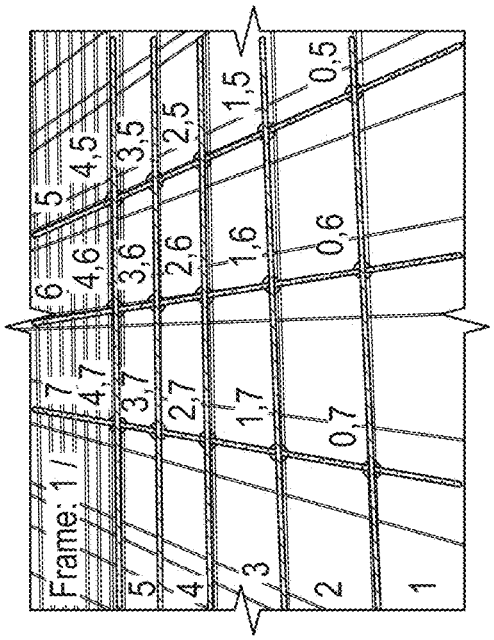

With a reference to FIGS. 9A, 9B, 9C and 9D illustrate, in FIG. 9A line detection processing, in FIG. 9B horizontal and vertical line filtering, in FIG. 9C numbering of borders and vertical borders and intersections, and in FIG. 9D numbering panels of an exemplary solar panel assessment system in accordance with an embodiment. In FIGS. 9A, 9B, 9C and 9D the results of different steps of stages in the panel assessment recognition algorithm; beginning with FIG. 9A of line detection processing using Hough transform algorithmic solutions; next in FIG. 9B of using filtering algorithmic solutions to filter horizontal lines and vertical lines; third, in FIG. 9C adding identification information by numbering the horizontal borders and vertical borders and related intersections; and finally, in FIG. 9D presenting the numbered panels.

With continued reference to FIGS. 9A-D, as previously explained, the panel assessment recognition algorithm treats lines used as features. Although the images of panels in the PV array is of a continuous region that may fail to exhibit significant contrasting characteristics from the background, the panel edges and the rectangular contour formed by the edges are beneficial to identify the panel. The captured images of the panel are captured in 8-bit IR frames which is initially when processed smoothed using a Gaussian Pyramid. This enables more precise edge detection where the edges are detected using Canny edge detection techniques. The probabilistic Hough line transform solution is applied to the edge map created by the edge detection for the line detection. The line detection generally will detect large numbers of line segments, many of which are redundant as shown in FIG. 9A. These lines (and segments) are then divided into two groups: vertical lines and horizontal lines, based upon their relative angles. The vertical lines generally move from left to right or right to left relative to the IR camera perspective view as a related index number is incremented in a count-up, while the horizontal lines are always associated with the same index number. Hence, vertical lines and horizontal lines are treated differently in the remainder of the algorithmic solution. In the next step, both horizontal and vertical lines are filtered based upon their distance as follows: in FIG. 3B, if the distance between two lines is smaller than a pre-defined threshold, then these sets of lines are considered the same line and an "average line" will be calculated from their position. After merging these closely spaced lines, all vertical and horizontal lines are sorted in accordance to the line positions within the frame (e.g., from left to right, from top to bottom). Hence, these are deemed as the candidates of the actual lines of the panels.

The corners and contours are two additional features that are used in panel assessment algorithmic solution to validate or enhance horizontal line detection as horizontal lines are difficult to detect accurately. This is because blurry frames often captured are at times problematic to the line detector, especially when there are no clear edges that separate the top row or the bottom row from the background. Because the corners are usually aligned on panel edges, therefore using this principal the missing lines can be estimated if multiple corners are aligned along a line. The contour detection is based upon a line segment map generated. The contours that have rectangle-like shapes may be recorded. Since, the top horizontal line and the bottom horizontal line are often the lines more likely to be missed by the line detection process, the rectangle-like contours are added indicators of the location of the middle rows. For example, if the PV array is four rows in height, the second and third rows are considered middle rows. Combining all information from the corner detection and the contour detection results in a location estimation for the middle rows. Once the middle rows are found (either detected or estimated), the relative positions of the top and the bottom rows can be estimated from the middle row location.

After the candidate lines are filtered, the horizontal border detection and the vertical border detection will determine whether these candidates are "true targets" or false alarms, and estimate missing borders from the "true targets". The "borders" represent the sides of the quadrilateral that frames a panel are relied upon rather than the "lines" given the unreliable results from the line detection algorithm. Border motion information in the previous frame is used in the border detections, in conjunction with contour features and corner features for more accurate determinations of the panel borders. Since, motion information describes how much or differences in distance each object moves from one frame to another frame; using the corner detection algorithmic solution, in this instance, a Shi Tomasi corner detection algorithm, the corners are first extracted from the previous frame and then tracked in the current frame using in conjunction Lucas Kanade algorithms for detecting the related optical flow. A global prospective (homography) transform matrix is then estimated from the motion vectors of all matched corner pairs based on random sample consensus RANSAC iterative estimations. The transform matrix P is examined by calculating the overlapping rate between the current frame and the warped version of the previous frame. By considering both frame rate and the velocity of the IR camera, the interframe motion resulting is generally deemed small. If the overlap area is larger than 80% of the image size, the estimated matrix P is considered a good estimation. Otherwise, if the overlap area is less than 80% then because the estimation is not deemed good, the algorithm calculates the transform matrix P from previous results. For calculation for frame i the estimate matrix P is as follows:

$$P_i = \frac{\sum_{k=1}^{5} P_{i-k}}{5}, \quad (1)$$

This calculation is simply a moving average of P in the past five frames (if applicable). This results in a robust estimation of P because the low image quality of a frame can significantly reduce the performance of the optical flow. By transforming every point in the previous frame to the current frame using the perspective transform matrix P as follows:

$$\begin{bmatrix} x' \\ y' \\ 1 \end{bmatrix} = P \begin{bmatrix} x \\ y \\ 1 \end{bmatrix} = \begin{bmatrix} p_{11} & p_{12} & p_{13} \\ p_{21} & p_{22} & p_{23} \\ p_{31} & p_{32} & p_{33} \end{bmatrix} \begin{bmatrix} x \\ y \\ 1 \end{bmatrix}, \quad (2)$$

Where in the transform matrix (x, y) is the coordinate of a point in the previous frame and (x', y') is the coordinate of its corresponding point in current frame. In the vertical border detection, every vertical border in the previous frame is projected to the current frame and then matched with new detected vertical lines in the current frame in accordance with the distance between them. Generally, a good match is deemed when there is a small distance between the warped border and the detected line. If a vertical border cannot find a good match, the detection algorithm will simply estimate its position in the current frame. Horizontal motion direction is also considered when adding newly detected vertical lines to the true border pool. The optical flow's horizontal X coordinates determine whether the IR camera is moving to the left, moving to the right, or is stationary.

If the IR camera is moving to the left, newly detected vertical lines will be added if they are to the left of all the warped vertical borders. This simple rule makes the vertical border detection more robust. A similar procedure is implemented in the horizontal border detection algorithm, except that the number of actual horizontal borders is fixed so that no additional border can be added once the horizontal borders are initialized. In addition, the horizontal border detection focuses more on estimating missing borders (usually the top and bottom borders).

The last step is to calculate the intersection of horizontal and vertical borders. Each intersection has a unique index, (h, v), where h is the index of the horizontal border across the intersection, and v is for the index of the vertical border. A panel's location is completely defined by any four adjacent intersections, e.g., intersection (2, 10), (2, 11), (3, 10), and (3, 11) are the four corners of a panel as shown in FIG. 9C. Then the panel location is defined i.e. intersections of the borders determined, the individual panels in FIG. 9D are assigned identification information panel ID, column, row and countered.

Figure 10:
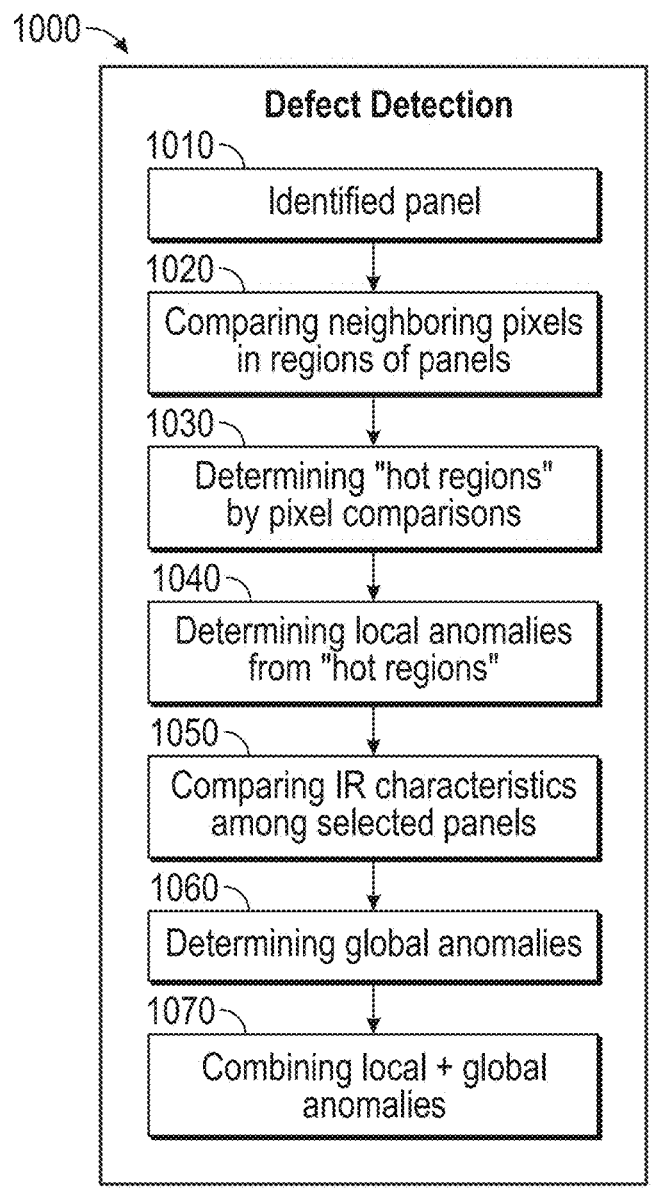
FIG. 10 illustrates a block diagram of the defect detection process flow of an exemplary solar panel assessment system in accordance with an embodiment.

With a reference to FIG. 10, FIG. 10 illustrates a block diagram of the defect detection process flow of an exemplary solar panel assessment system in accordance with an embodiment. In FIG. 10, at 1010, the panel is identified by the panel recognition system as local defects are detected one panel at a time. At step 1020, neighboring regions of samples of pixels are compared in individual panels by the detection processing module. At step 1030, by sample of pixel comparisons, "hot regions" are determined in the individual panel. At step 1040, local anomalies are determined by the detection processing module from the determined "hot" regions based upon various thresholds. At 1050, IR characteristics are compared on a panel by panel basis for determinations if an entire panel is warmer in relation to other panels. At 1060, by comparisons of the IR characteristics of the warmer panels identified with mean values of panels in rows and thresholds, determinations are made by a detection processing module that of "hot module" clusters by the panel comparisons. At 1070, the result is yielded by combining the results of the local and global anomalies. The detection module processing algorithm "Learns" which panels are defective automatically and the hot region detection is performed in real-time once panel segmentation is completed.

Figure 11:
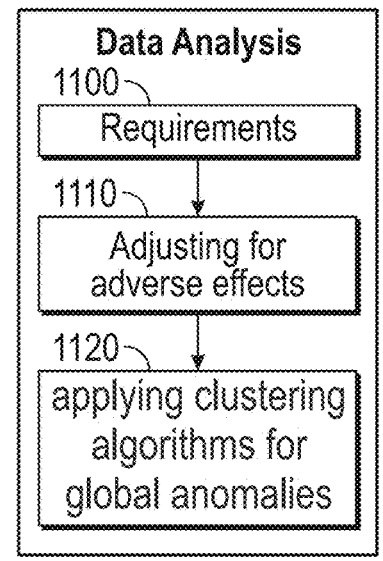
FIG. 11 illustrates a block diagram of data analysis of results with processing modules of requirements, adverse effects and clustering solutions of an exemplary solar panel assessment system in accordance with an embodiment.

With a reference to FIG. 11, FIG. 11 illustrates a block diagram of data analysis of results with processing modules of requirements, adverse effects and clustering solutions of an exemplary solar panel assessment system in accordance with an embodiment. The main issues that adversely affect panel recognition include bad initialization, missing top row, and bad image registration from optical flow. In an exemplary embodiment, occasionally, the first column of an array cannot be recognized by the algorithm because the first vertical edge is not obvious enough. In addition, the outer edges of an array are visually less prominent than the inter-module edges. Likewise, in the top row, for example, as shown in FIG. 9D, the top boundary is almost indistinguishable from another array in the background. Addition, computer vision applications such as template matching, luminous adjustments of the captured IR images, panoramic stitching applications, motion-de blur, lens shading, etc. may be introduced in conjunction with edge-based detection to address these issues. The panel assessment algorithm is, in instances, reliant upon the image registration provided by optical flow. If optical flow fails to associate feature points across frames, the numbering continuity of the modules will be affected. Accordingly, at 1100, a user inputs are limited in setting of initial settings for prevention of incorrect registrations used for the data analysis. At 1110, the user can manually check and correct for the adverse effects described above. At 1120, the detection module applies clustering algorithms for both global defect detection and uses thresholding for local hot spot detection.

Figure 12A:
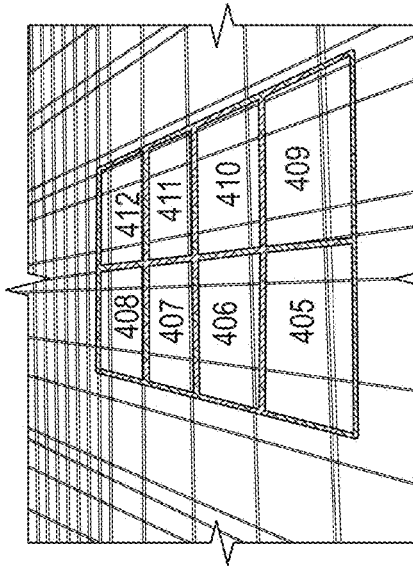
FIGS. 12A-D illustrates in diagrams as follows.
Figure 12B:
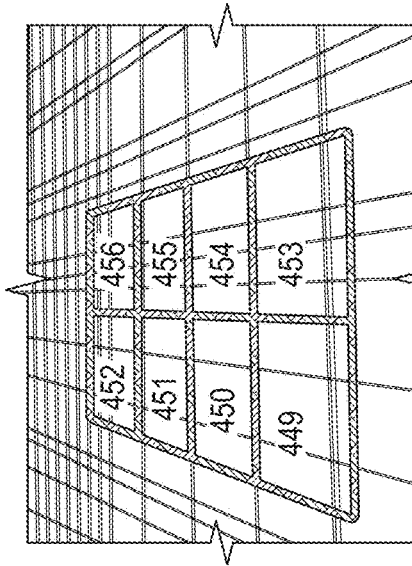
Figure 12C:
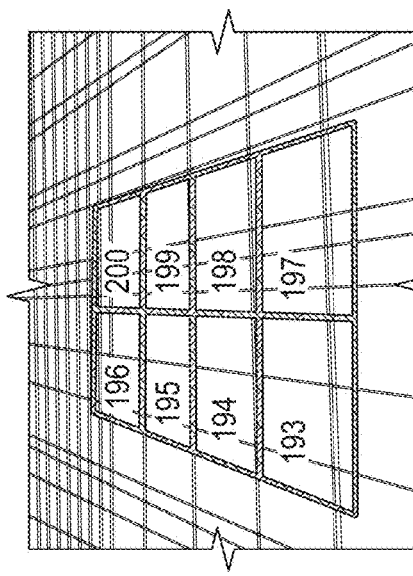
Figure 12D:
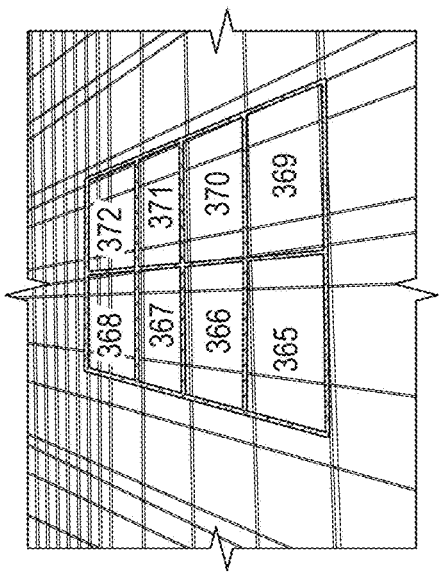

With references to FIGS. 12A-D, FIGS. 12A-D illustrate in diagrams as follows: in FIG. 12A panel recognition results of a captured IR image sequence, in FIG. 12B frame motion in a rightward direction, pausing of frame motion, in FIG. 12C frame motion in an opposite leftward direction, and in FIG. 12D frame motion reverting to a rightward direction of an exemplary solar panel assessment system in accordance with an embodiment.

In accordance with an exemplary embodiment, FIGS. 12A-D illustrates demonstrations of frames detected of panel recognition results from a video sequence captured. The IR camera is mounted on a cart type vehicle is first moving towards a right direction in FIG. 12A, and then slowed or decreased in velocity of movement and subsequently stopped in FIG. 12B. The panel recognizer automatically switched to a backing-up mode and begins a count down when the cart is backing up in FIG. 12C. The cart began commences moving to the right again toward the end of the array with the algorithm not losing continuity as shown in FIG. 12D. Because all PV panels have identical appearance, it is critical to "track" and number the modules continuously. Failing to detect any panel will result in subsequent panels being numbered incorrectly. FIGS. 12A-D illustrate the panel recognition systems configured to handle several different scenarios such as changing direction or standing still. In addition, if the IR camera turns away from the panels and back again, continuity may also be lost. Hence, additional, computer vision applications and GPS monitoring may be incorporated in the present implementation to address such issues. To number the modules correctly, the panel recognition algorithm may use the same module image captured in consecutive frames with a horizontal shift smaller than the width of a module. Additionally, in instances velocity of the cart may be bounded by segmentation performance. That is, a lower bound by module recognition heuristics when a minimal amount of motion is required; an upper bound when optical flow cannot find a suitable image transformation. Also, in instances, frame-rate is bounded by computation time, that is a lower bound when optical flow cannot find a suitable image transformation and an upper bound when frames are received faster than the segmentation algorithm can process.

Figures 13, 14:
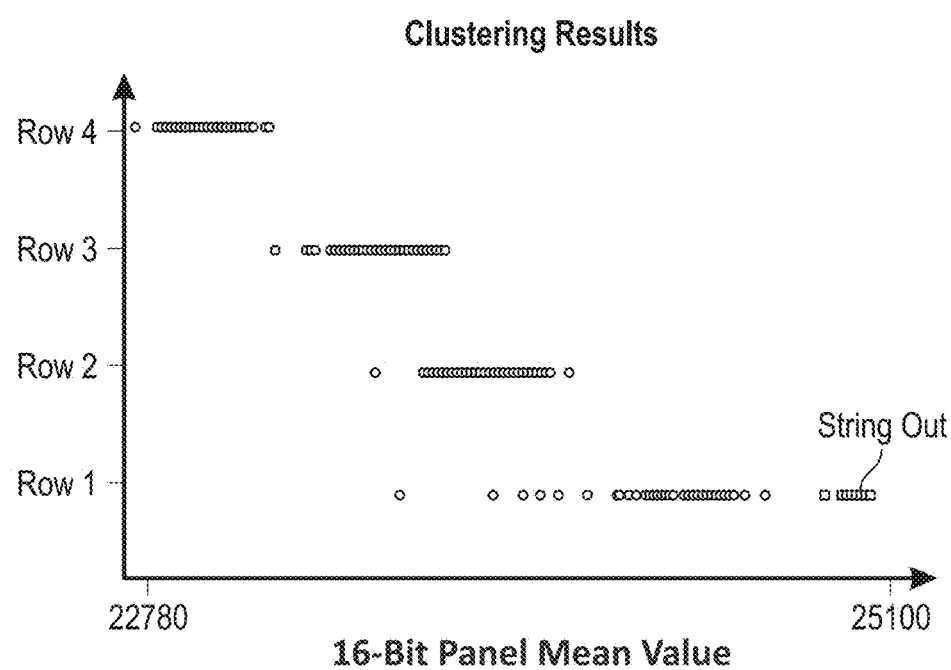
FIG. 13 illustrates a chart of clustering of data related to IR image capture of an individual panel performed after the entire array has been IR image captured and a clustering solution of data of segmented panels of an exemplary solar panel assessment system in accordance with an embodiment.
FIG. 14 is a table illustrating a summary of empirical results of panel recognition and defect detection performance for panels, local anomalies, and hot panels of an exemplary solar panel assessment system in accordance with an embodiment.

With a reference to FIG. 13, FIG. 13 illustrates a chart of clustering of data related to IR image capture of an individual panel performed after the entire array has been IR image captured and a clustering solution of data of segmented panels of an exemplary solar panel assessment system in accordance with an embodiment. In FIG. 13, the "Hot Module" DBSCAN clustering is performed after the entire array has been imaged. Additionally, it is performed on a row-by-row basis and the data samples as illustrated for each segmented module are clustered corresponding to the radius and minimum points defining a cluster. The "string out" data samples are the outlying data and accordingly, indicative of "Hot Modules".

With a reference to FIG. 14, FIG. 14 is a table illustrating a summary of empirical results of panel recognition and defect detection performance for panels, local anomalies, and hot panels of an exemplary solar panel assessment system in accordance with an embodiment.

The first row in Table 1 of FIG. 14 shows a summary of the panel recognition results attained of a detection rate of 97.9% and a low false alarm rate of 0.06%. The real-time operation is performed on laptop configured with a WINDOWS® OS, the PV panel classification occurs after an entire array has been imaged, the "Hot Region" detection is performed in real-time once an individual panel is segmented, and added panel location(s) information within each array allows for localization within PV solar farm.

Figure 15:
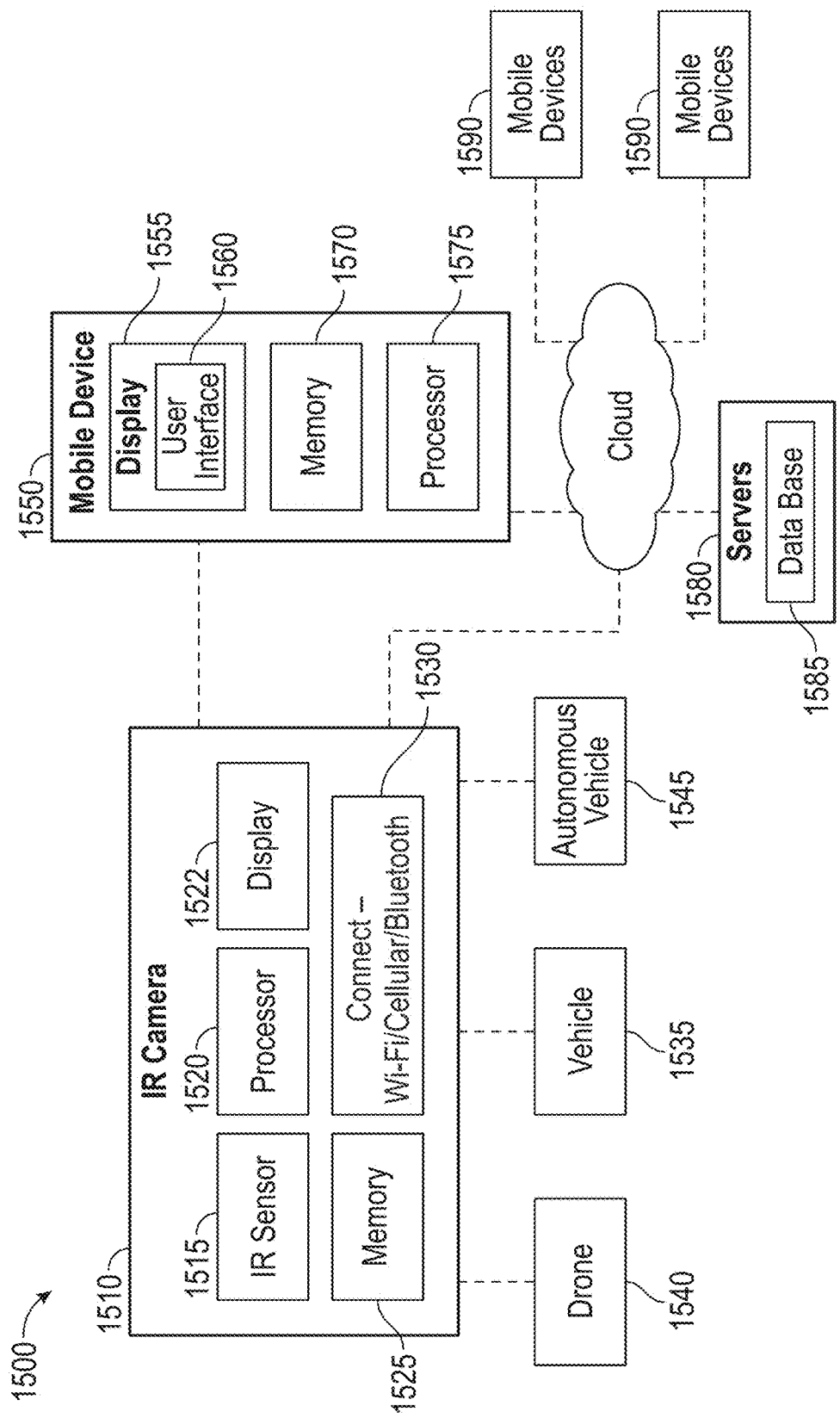
FIG. 15 is a diagram illustrating a cloud based configuration of implementation of the IR camera, mobile devices, drones, vehicles and related components of an exemplary solar panel assessment system in accordance with an embodiment.

FIG. 15 is a diagram illustrating a cloud based configuration of implementation of the IR camera, mobile devices, drones, vehicles and related components of an exemplary solar panel assessment system in accordance with an embodiment. In FIG. 15, the panel assessment system 1500 includes an IR camera 1510. The IR camera 1510 may be configured with an IR sensor 1515, local processor 1520, a display 1522, memory 1525 and connectivity Wi-Fi/Cellular 1530. The raw data captured by the IR sensor 1515 may be processed at the sensor, locally or at a remote server. In addition, the IR image data may be stored locally at memory 1525, at the mobile device of a remote server. The IR camera 1510 may be mounted on a drone (vehicular or aerial) 1540, a vehicle 1535, or an autonomous vehicle device 1545. In addition, the device may be operated locally, may be automated in operation and utilize machine learning and AI applications. The IR camera 1510 may be mounted on any device capable of positioning the IR camera 1510 with the appropriate field of view. For example, robotic type of devices may also be used. The IR camera 1510 may be directly or indirectly coupled to a mobile device 1550 or may be remotely coupled to devices interconnected to remote servers 1580. In addition, the mobile device may be couple via an app or in-app using various app platforms and may be configured with a variety of operating systems including ANDROID™, iOS®, Windows Mobile, Windows®, Linux, etc. The IR camera 1510 may communicate with the mobile device, server via Wi-Fi, Bluetooth, Cellular, LTE, WiMAX, CDMA, or a combination directly or via hosted application servers. The mobile device may be a smart phone, wearable devices configured with sufficient processor 1575, memory 1570, display 1555 and user interface 1560 capabilities. Additional mobile devices 1590 may be employed in conjunction or may be used for providing additional learning data or capabilities. A remote data base 1585 may be used for storing imaging data at remote servers 1580 and may employ a multi-tenant data base structure linking with the database in the memory of the local devices of the mobile device 1550 and the IR camera 1510. Updates may be provided via the cloud to the IR camera 1510 and the mobile device 1550.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention.

It being understood that various changes may be made in the function and arrangement of elements described in an exemplary embodiment without departing from the scope of the invention as set forth in the appended claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, and/or any other connection.

When language similar to "at least one of A, B, or C" or "at least one of A, B, and C" is used in the claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. A computer program product tangibly embodied in a computer-readable storage device and comprising instructions that when executed by a processor performs a method for automatically detecting a module from a plurality of modules, and for detecting defects within the module and additionally for detecting entire module failures using an infra-red camera, the method comprising:

capturing sequences of images of the plurality of modules by the infrared camera wherein the infrared camera is positioned with a field of view for enabling lines to be captured within the images and for line detection to be performed by algorithmic solutions and for classifying the lines as either horizontal or vertical lines;

filtering the lines which have been classified as horizontal or vertical based on a distance between the lines by combining together pairs of either horizontal and/or vertical lines determined to be spaced apart smaller than a threshold distance from each other;

estimating horizontal and vertical lines that have not been detected in a current frame by using prior detections of horizontal and vertical lines of a previous frame of images which have been captured; and defining modules in the plurality of modules by determining intersections of the horizontal and vertical lines which have been detected at least in the current frame or have been combined with horizontal and vertical lines estimated in the prior frame.

2. The method of claim 1, the estimating of horizontal and vertical lines further comprising:

detecting corners in a current frame of a module for aligning the corners of the module to provide additional estimations of horizontal and vertical lines which have not been detected in the current frame when defining the module.

3. The method of claim 2, the defining of modules further comprising:

detecting contours in a current frame of a module to recognize rectangular shapes within a frame to record as a module.

4. The method of claim 1, comprising:

accounting for an optical flow of the infrared camera while capturing images of the plurality of modules to sequentially track the modules and to add associated identifiers for tracking and generating counts of the modules which have been defined.

5. The method of claim 3, comprising:

combining a set of results obtained from detecting corners and contours to estimate locations of a middle row of modules in the sequences of images of the plurality of modules.

6. The method of claim 5, comprising:

estimating locations of a top row and a bottom row of modules in the sequence of images of the plurality of modules from the estimated locations of the middle row of modules.

7. The method of claim 1, comprising:

detecting local defects within a module by comparing pixel values of pixel samples of images of modules which have been defined to an adaptive threshold value for determining local anomalies.

8. The method of claim 1, the detecting of entire module failure comprising:

detecting hot regions by comparing, using clustering algorithms, a value of thermal characteristics of a module which has been defined to a mean value of the thermal characteristics of a plurality of modules which have been defined for determining global anomalies relating to entire module failure.

9. A system comprising:

at least one processor; and at least one computer-readable storage device comprising instructions that when executed causes performance of a method for module recognition and for detecting defects using an infra-red camera, the method comprising:

capturing sequences of images of a plurality of modules by the infrared camera wherein the infrared camera is configured for enabling lines to be captured within the images and for line detection to be performed by algorithmic solutions and for classifying the lines as either horizontal or vertical lines;

filtering the lines which have been classified as horizontal or vertical based on a distance between the lines by combining together pairs of either horizontal and/or vertical lines determined to be spaced apart smaller than a threshold distance from each other;

estimating horizontal and vertical lines that have not been detected in a current frame by using prior detections of horizontal and vertical lines of a previous frame of images which have been captured; and defining modules in the plurality of modules by determining intersections of the horizontal and vertical lines which have been detected at least in the current frame or have been combined with horizontal and vertical lines estimated in the prior frame.

10. The system of claim 9, comprising:

accounting for an optical flow of the infrared camera while capturing images of the plurality of modules to sequentially track the modules and to add associated identifiers for tracking and generating counts of the modules which have been defined.

11. The system of claim 9, comprising:

detecting local defects within a module by comparing pixel values of pixel samples of images of modules which have been defined to an adaptive threshold value for determining local anomalies.

12. The system of claim 9, comprising: detecting of entire module failure which comprises:

detecting hot regions by comparing, using clustering algorithms, a value of thermal characteristics of a module which has been defined to a mean value of the thermal characteristics of a plurality of modules which have been defined for determining global anomalies relating to the entire module failure.

* * * * *